United States Patent [19]

Büthker

[11] Patent Number: 5,859,512
[45] Date of Patent: Jan. 12, 1999

[54] DRIVE CIRCUIT SUPPLYING DRIVE SIGNALS TO A PLURALITY OF WINDINGS OF A MULTI-PHASE D.C. MOTOR

[75] Inventor: Henricus C. J. Büthker, Eindhover, Netherlands

[73] Assignee: U.S. Philips Corporation, New York, N.Y.

[21] Appl. No.: 787,597

[22] Filed: Jan. 22, 1997

[30] Foreign Application Priority Data

Jan. 24, 1996 [EP] European Pat. Off. .............. 96200163

[51] Int. Cl.$^6$ ....................................................... H02P 6/02
[52] U.S. Cl. .......................... 318/254; 318/138; 318/439; 318/560; 360/73.08
[58] Field of Search ..................................... 318/138, 139, 318/245, 254, 439, 800–832, 459; 360/72–78

[56] References Cited

U.S. PATENT DOCUMENTS

| | | | |
|---|---|---|---|
| 4,528,486 | 7/1985 | Flaig et al. ................................. | 318/254 |
| 4,743,815 | 5/1988 | Gee et al. ................................... | 318/254 |
| 4,912,378 | 3/1990 | Vukosavic ................................. | 318/254 |
| 4,928,043 | 5/1990 | Plunkett .................................... | 318/254 |
| 5,172,036 | 12/1992 | Cameron .................................. | 318/138 |
| 5,198,733 | 3/1993 | Wright ...................................... | 318/254 |
| 5,221,881 | 6/1993 | Cameron .................................. | 318/254 |
| 5,291,106 | 3/1994 | Murty et al. .............................. | 318/375 |
| 5,306,988 | 4/1994 | Carobolante et al. .................... | 318/254 |
| 5,367,234 | 11/1994 | DiTucci ................................... | 318/254 |
| 5,517,095 | 5/1996 | Carobolante et al. .................... | 318/254 |
| 5,569,988 | 10/1996 | Kokami et al. .......................... | 318/254 |
| 5,572,097 | 11/1996 | Cameron ................................. | 318/254 |
| 5,574,346 | 11/1996 | Chavan et al. ........................... | 318/434 |
| 5,616,996 | 4/1997 | Tang et al. ................................ | 318/439 |
| 5,619,109 | 4/1997 | Cameron et al. ........................ | 318/375 |
| 5,631,999 | 5/1997 | Dinsomore ............................... | 388/805 |
| 5,640,073 | 6/1997 | Ikeda et al. .............................. | 318/439 |

FOREIGN PATENT DOCUMENTS

0730341A2  9/1996  European Pat. Off. .

Primary Examiner—Paul Ip
Attorney, Agent, or Firm—Edward Blocker; Bernard Franzblau

[57] ABSTRACT

A drive circuit for supplying drive signals to a plurality of windings of a multi-phase d.c. motor. The drive circuit comprises a multi-phase inverter which supplies the drive signals to the motor windings; a phase detector which samples the back-emf signal of a winding in order to obtain a phase-error signal; a low-pass filter which generates a control signal dependent upon the phase-error signal; and a controllable oscillator which generates a frequency signal whose phase and frequency depend on the control signal. The timing with which the multi-phase inverter supplies the drive signals to the windings is dependent on the frequency signal. The drive circuit further comprises a masking circuit for temporarily inhibiting the further processing of the phase-error signal by the low-pass filter, at least during the presence of a flyback signal in the phase-error signal, as a result of which the processing of the flyback pulses present in the phase-error signal is inhibited.

29 Claims, 5 Drawing Sheets

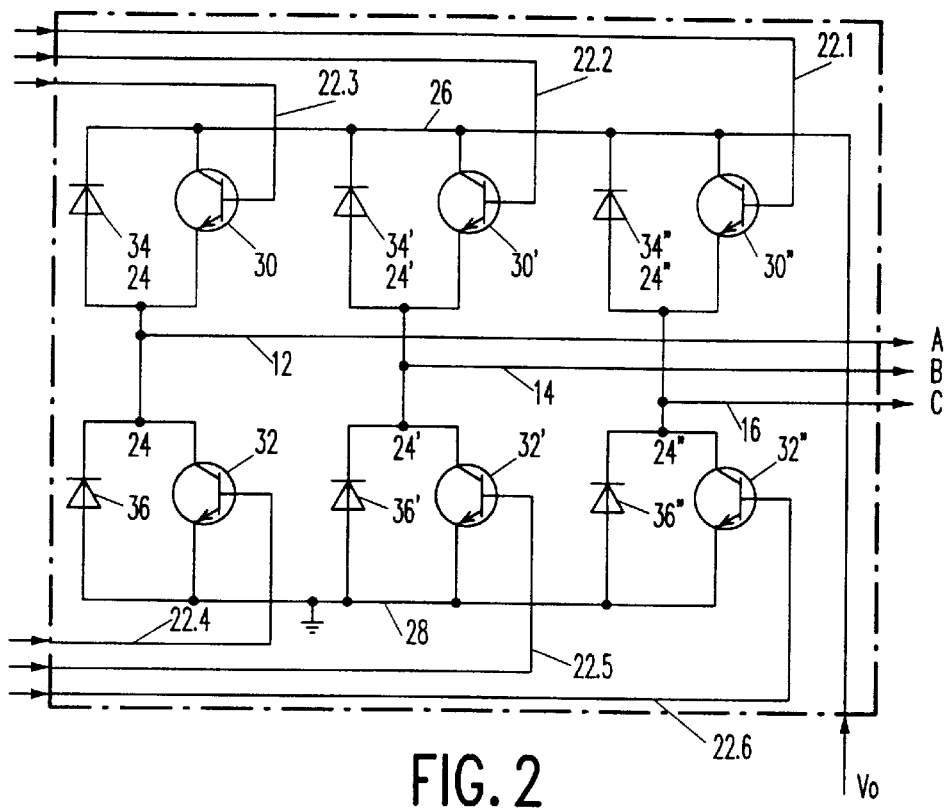
FIG. 2
| F | from | to | FC | A | B | C |
|---|---|---|---|---|---|---|
| 1 | A | B | C | Pa | Pa | Pv |
| 2 | A | C | B | Pa | Pv | Pa |
| 3 | B | C | A | Pv | Pa | Pa |
| 4 | B | A | C | Pa | Pa | Pv |
| 5 | C | A | B | Pa | Pv | Pa |
| 6 | C | B | A | Pv | Pa | Pa |
FIG. 3
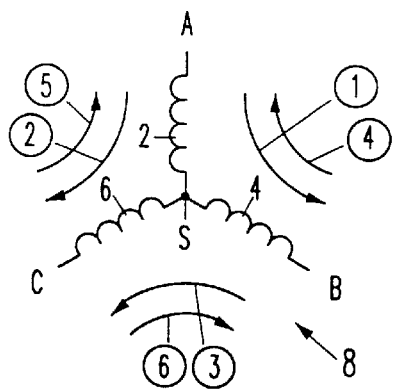
FIG. 4

DRIVE CIRCUIT SUPPLYING DRIVE SIGNALS TO A PLURALITY OF WINDINGS OF A MULTI-PHASE D.C. MOTOR

BACKGROUND

1. Field of the Invention

This invention relates to a drive circuit for supplying drive signals to a plurality of windings of a multi-phase d.c. motor, comprising a multi-phase inverter which supplies the drive signals to the windings of the motor in such a manner that these windings are recurrently energized by the drive signals in a given sequence, at least one winding not being supplied with a drive signal at least during predetermined free periods;

a phase detector which under control of said multi-phase inverter, during a plurality of said free periods in which no drive signal is applied to said at least one winding, samples the back-emf signal of this winding in order to obtain a phase-error signal;

a low-pass filter which generates a control signal in dependence upon the phase-error signal; and a controllable oscillator which generates a frequency signal whose phase and frequency depend on the control signal, the timing with which the multi-phase inverter supplies the drive signals to the windings being dependent on the frequency and phase of the frequency signal. The invention also relates to a drive system comprising a multi-phase d.c. motor and such a drive circuit. The invention further relates to a disk drive including such a drive system.

2. Related Art

Brushless d.c. motors driven by an inverter generally use a feedback loop to maintain a desired phase-angle relationship between the position of the rotor and the stator at the instant that a winding is energized. The phase-angle relationship may be selected, for example, in such a manner that the motor produces a maximal torque.

A free period of a winding generally occurs within or coincides with a drive period of another winding, in which this other winding receives drive signals. The beginning and the end of a free period of a winding generally also coincides with the beginning or the end of a drive period of other windings. In the case of, for example, a three-phase motor this means that at any instant a drive signal is applied to two windings (during two drive periods which are 120° phase-shifted relative to one another), while no drive signal is applied to a third winding (during a free period which is half as long as each drive period). This third winding is kept "floating" and generates a back-emf signal, known per se.

Such a drive circuit is known from U.S. Pat. No. 4,928,043. This known circuit includes a feedback loop comprising the phase detector, the low-pass filter and the controllable oscillator. This feedback loop is consequently a phase-locked loop (PLL). The phase detector combines the successive back-emf signals from one or more windings to form the phase error signal, in which all back-emf signals are given the same polarity. The low-pass filter is constructed as an integrator which compares the back-emf voltages of a winding with a reference value and integrates the difference in order to obtain a control signal for the oscillator. The control signal controls the oscillator of the VCO type, which in its turn controls the switching instants of the multi-phase converter. If the desired position of the rotor of the motor, which is determined by the inverter, deviates from the actual position of the rotor, the voltage of the control signal will change accordingly and will cause the VCO to correct the switching instants of the inverter so as to counteract the deviation. The voltage of the back-emf signal has an optimum for which the motor generates a maximal torque. By means of the PLL a deviation of this voltage results in a change of the control signal so as to counteract the deviation.

For an optimum efficiency the known circuit has a switched current regulator which modulates the pulse width of the drive signals (pulse width modulation). This technique gives rise to spurious components on the back-emf signal. Since the known circuit uses a phase-locked loop (PLL) the susceptibility to these spurious components has decreased considerably.

However, the known circuit with a phase-locked loop has the problem that it does not operate correctly when the motor is started because commutations do not occur at the ideal instant.

SUMMARY

It is one of the objects of the invention to solve this problem. To this end, a drive circuit in accordance with the invention is characterized in that the drive circuit further comprises a masking circuit for inhibiting the further processing of the phase-error signal by the low-pass filter temporarily, at least during the presence of a flyback signal in the phase-error signal, as a result of which the processing of the flyback pulses present in the phase-error signal is inhibited.

The masking circuit thus eliminates the flyback pulses from the phase error signal, i.e. from the sampled back-emf signal applied to the low-pass filter. After a commutation (switching instant of the inverter) a flyback pulse appears, whose duration depends on the motor current and the self-induction effect. The duration of a flyback pulse is consequently long while the motor is started and at low speeds of the motor. Conversely, the back-emf signal is small while the motor is started and at low speeds of the motor. This means that the flyback pulses prevail over the back-emf signal. As a result of this, the low-pass filter formed by an integrator will generate a deviating control signal. A deviating control signal means that commutation is not effected at the ideal instant. Since, in accordance with the invention, the flyback pulses have been eliminated direct starting is possible by means of the phase-locked-loop circuit. Moreover, this guarantees that commutation occurs at the ideal instant at any speed, i.e. also at low speeds. The flyback pulses appear immediately after the oscillator initiates a commutation. The masking circuit can determine this instant for example directly on the basis of the output signal of the oscillator. Preferably, the end of the flyback pulse is detected by means of a detection circuit. This circuit may comprise, for example, a comparator which compares the sampled back-emf or a quantity derived therefrom with a reference value. The detection circuit may, for example, also be constructed as an edge detector to detect the end of the flyback pulse.

More particularly, the masking circuit comprises first switching means for interrupting the supply of the phase-error signal to the low-pass filter to inhibit the further processing of flyback pulses. The switching means form a very effective and economically advantageous means for the suppression of the flyback pulses.

As already stated, a commutation is initiated by the oscillator. Owing to internal delays the actual commutation, i.e. the response of the inverter to the frequency signal of the oscillator will appear slightly later. This also gives rise to some spurious components in the sampled back-emf signal. In order to ensure that these spurious components are also eliminated, the masking circuit inhibits the supply of the phase-error signal to the low-pass filter, preferably at least for a predetermined minimum period.

If for any reason whatsoever the masking circuit fails to detect the end of a flyback pulse or in the absence of a flyback pulse, it is undesirable that the masking circuit inhibits the supply of the phase-error signal to the low-pass filter for the entire free period. In order to preclude this the masking circuit in accordance with the invention terminates the inhibition preferably after a predetermined maximum period of a predetermined length. Generally, this maximum period will be chosen to be equal to the envisaged maximum duration of a flyback pulse which occurs when the motor is started with a maximum current through the windings.

In the preferred embodiment of the invention the masking circuit supplies a first reference signal to the low-pass filter when the supply of the phase-error signal to the low-pass filter is interrupted. This has the advantage that no undefined transients occur at the input of the low-pass filter at the instant of interruption. Particularly when the first reference signal is a direct voltage which is also used as the reference value applied to the low-pass filter constructed as an integrated amplifier, no difference voltage will appear at the input of the low-pass filter when the supply of the phase-error signal to the low-pass filter is interrupted.

The U.S. Pat. Nos. 5,306,988 and 5,221,881 also disclose a drive circuit for controlling a brushless d.c. motor, the device comprising a masking circuit for inhibiting a zero-crossing detection circuit which detects when the back-emf signal passes through zero. However, said drive circuit does not comprise a phase-locked loop, the timing with which the multi-phase inverter recurrently supplies the drive signals to the windings being dependent on the frequency and phase of the frequency signal generated by the phaselocked loop. Moreover, the zero-crossing detection circuit is inhibited for a fixed time and not for a variable time, as is preferably the case in the drive circuit in accordance with the invention. Inhibiting for a fixed time has the disadvantage that the flyback pulse is generally still present when the circuit is reactivated upon starting of the motor. In other words, the fixed time is shorter than the duration of the flyback pulse. However, if the fixed time is selected to be so long that the flyback pulse is fully suppressed upon starting of the motor, a satisfactory control will no longer be possible at higher speeds, because then too large a portion of the back-emf signal will be suppressed.

BRIEF DESCRIPTION OF THE DRAWINGS

The invention will now be described in more detail with reference to the drawings. In the drawings:

FIG. 2 shows an example of a powersupply circuit of the drive circuit shown in FIG. 1;

FIG. 3 is a table to illustrate the operation of the drive circuit shown in FIG. 1;

FIG. 4 shows diagrammatically drive signals successively applied to a motor by the drive circuit shown in FIG. 1;

DESCRIPTION OF THE PREFERRED EMBODIMENTS

Figure 1:
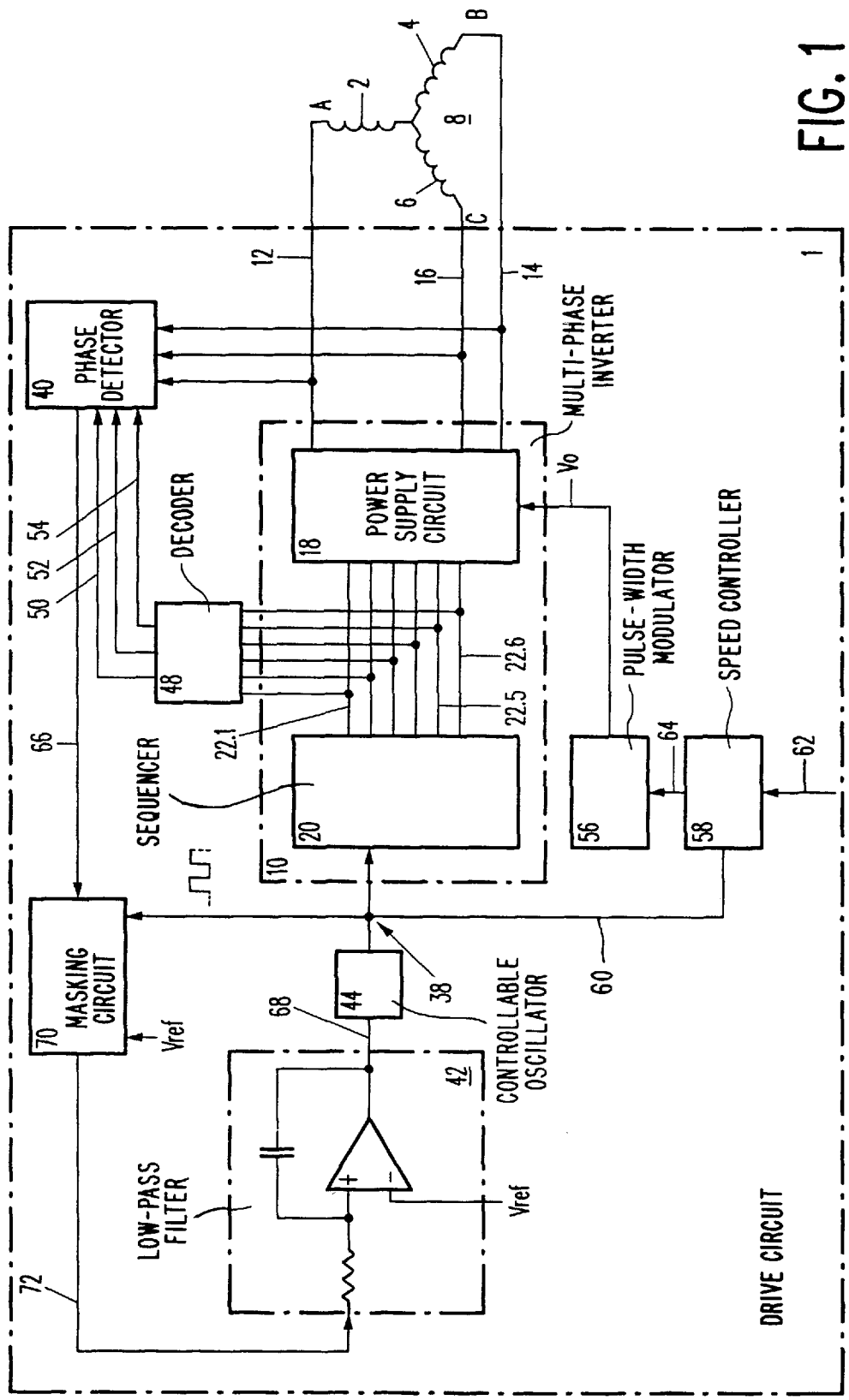
FIG. 1 shows a possible embodiment of a drive circuit in accordance with the invention.

In FIG. 1 the reference numeral 1 denotes a drive circuit for supplying drive signals to three windings 2, 4, 6 of a three-phase brushless d.c. motor 8. The windings of the stator of the motor are recurrently supplied with drive signals in a given sequence, in such a manner that the magnetic rotor of the motor is set into rotation, at least one winding not being supplied with drive signals during predetermined free periods. In the present example all three windings recurrently but not simultaneously receive no drive signals in predetermined free periods. The drive circuit 1 comprises a multi-phase inverter 10, known per se, for applying the drive signals to the windings 2, 4, 6 of the motor 8 in the above manner. The drive signals generated by the multi-phase inverter 10 are applied to the windings 2, 4, 6 of the motor 8 via lines 12, 14, 16.

In the present example the multi-phase inverter 10 is a three-phase inverter, because in this case a three-phase d.c. motor is to be driven. In this example the multi-phase inverter 10 comprises a power-supply circuit 18 and a sequencer 20. The sequencer 20 drives the power-supply circuit 18 sequentially via the lines 22.1–22.6 in such a manner that the power-supply circuit 18 supplies drive signals to the windings 2, 4, 6 in a sequential fashion, i.e. recurrently in a given sequence. FIG. 2 shows an example of the power-supply circuit 18. The power-supply circuit 18 comprises a conventional triple half-H-bridge. The power-supply circuit 18 comprises three series current paths 24, 24', 24" arranged between a power-supply line 26 and a zero-potential line 28. In the present example, a supply voltage $V_o$ is applied to the power-supply line 26 and the zero-potential line is connected to ground.

Each current path 24, 24', 24" comprises two series-connected transistors 30, 32; 30', 32, 30", 32". The transistors 30, 30", 30"32, 32', 32" may each comprise, for example, a FET known per se or any other switching means. Moreover, each transistor 30, 30', 30"32, 32', 32" has an associated flyback diode 34, 34", 34', 36, 36', 36". Each flyback diode is arranged in antiparallel with the associated transistor. The flyback signals generated by a back-emf voltage produced in a winding during a free period of this winding can flow through the flyback diodes. The supply lines 12, 14, 16 are respectively connected to nodes A, B, C between the transistors 30, 30', 30", 32, 32', 32".

The operation of the power-supply circuit 18 will be described in more detail with reference to the table in FIG. 3 and with reference to FIG. 4 which shows the motor 8. The terminals of the windings 2, 4, 6 are shown as the nodes A, B and C in FIG. 4 and correspond to the nodes A, B and C in FIGS. 1 to 3. In general, it holds that in operation one node (for example the node A) is connected to the power-supply line 26, another node (for example the node B) is connected to the zero-potential line 28, and the last node (for example the node C) is kept floating. Thus, six different phases are conceivable. For example, in a first phase F the power-supply circuit is controlled via the line 22.3 so as to turn on the transistor 30, thereby connecting the node A to the power-supply line 26. In the first phase F the transistor 32'is at the same time driven via the line 22.5 so as to connect the node B to the zero-potential line 28. The other transistors are turned off in the first phase F. As a result of this, a drive current is produced during the first phase F, which current flows from the power-supply line 26 to the node A via the transistor 30, from the node A to the node B via the windings 2 and 4, and from the node B to the line 28 via the transistor 32'. The node C then remains floating. The first phase is shown in FIG. 3 and FIG. 4. The first line of FIG. 3 shows that a current flows from the node A to the node B, while the node C is kept floating. In FIG. 4 this current is indicated by an arrow marked by an encircled reference numeral 1. In an entirely similar manner, a current flows in phase two from the node A to the node C, while the node B is kept floating. The other phases three to six, are shown in a similar way in FIG. 3 and FIG. 4. Moreover, a drive period $P_a$ can be defined in which drive signals are applied to a winding of a motor. A free period $P_v$ can be defined as a period in which no drive signal is applied to a winding. FIG. 3 also gives the drive period $P_a$ and the free period $P_v$. This Figure shows that drive signals are applied to the motor windings during given drive periods $P_a$ in such a manner that in the present example no drive signal is applied to one winding during drive periods $P_a$ of two windings. Moreover, the beginning and the end of a free period coincides with a beginning or an end of a drive period, each drive period being twice as long as one free period.

During the free period $P_v$, as stated hereinbefore, one of the nodes A, B or C is kept floating. However, if for example the node C is kept floating in the first phase, the rotation of the rotor of the motor will generate an induction voltage in the winding 6. This induction voltage is available between the node C and the star point S of the three windings and is referred to hereinafter as the back-emf signal. Likewise, a back-emf signal is generated between the node B and the star point S in the second phase F, a back-emf signal between the node A and the star point S in the third phase F etc.

The sequencer 20 is of a generally known type and in the rhythm of a frequency signal to be defined hereinafter, which signal comprises a clock signal and is applied via a line 38, it generates on the lines 22.1–22.6 signals which recurrently turn on the transistors 30, 30', 30", 32, 32', 32" in the sequence given in the Table of FIG. 3. The sequencer 20 may comprise, for example, a shift register, known per se, which is shifted through six times during one electrical revolution of the motor. In the present example, the clock signal on the line 38 therefore has a frequency which is a factor of six as high as the rotation frequency of the rotor.

The above-mentioned back-emf signals, generated respectively in the windings 2, 4, 6, contain information about the actual position of the rotor of the motor. These signals can therefore be used for comparing an actual rotor position with a desired rotor position, so as to allow the actual rotor position to be corrected, if necessary. For this purpose, the drive circuit includes a feedback loop comprising a phase detector 40, a low-pass filter 42 and a controllable oscillator 44. The back-emf signals, which are representative of the actual rotor position, are applied to the phase detector 40 via lines 12, 14, 16. By means of a decoder 48 to be described hereinafter, the desired rotor position can be derived from the output signals generated on the lines 22.1–22.6 by the sequencer 20 and corresponding signals are applied to the phase detector 40 via lines 50, 52, 54. In the present example, the controllable oscillator 44 is a VCO (Voltage Controlled Oscillator). The drive circuit further comprises a pulse-width modulator 56, which generates a pulsating supply voltage $V_o$, which is applied to the power-supply circuit 18. The speed of the motor can be controlled by varying the pulse width of the supply voltage $V_o$. To this end, the drive circuit comprises a speed controller 58, which controls the pulse-width modulator 56. The output signal of the oscillator 44 is a measure of the motor speed and is applied to the speed controller 58 via a line 60. The speed controller 58 compares the actual speed, represented by the signal on the line 60, with the desired speed, which is input to the speed controller 58, for example, via a line 62. If there is a difference between the desired speed input via the line 62 and the actual speed in accordance with the signal on the line 60, the speed controller 58 can control the pulse-width modulator 56 via the line 64 so as to reduce the speed difference to zero.

The use of pulse-width control to control the motor speed has the advantage that a high efficiency is attainable. The pulse-width modulation does give rise to spurious components on the back-emf signal. However, since said feedback loop is a phase-locked loop, these spurious components will not adversely affect the control of the instantaneous position of the rotor. The low-pass filter 42 removes the high-frequency spurious components caused by the pulse-width modulation. Thus, the phase-locked loop maintains the desired phase-angle relationship between the position of the rotor and the stator, even when the speed of the motor is controlled by pulse-width modulation.

The controllable oscillator 44 generates the aforementioned frequency signal comprising a clock signal and clocks the sequencer 20 via the line 38.

The operation of the drive circuit and, particularly, of the feedback loop of the drive circuit will be explained by means of the diagrams of FIG. 5.

Figure 5:
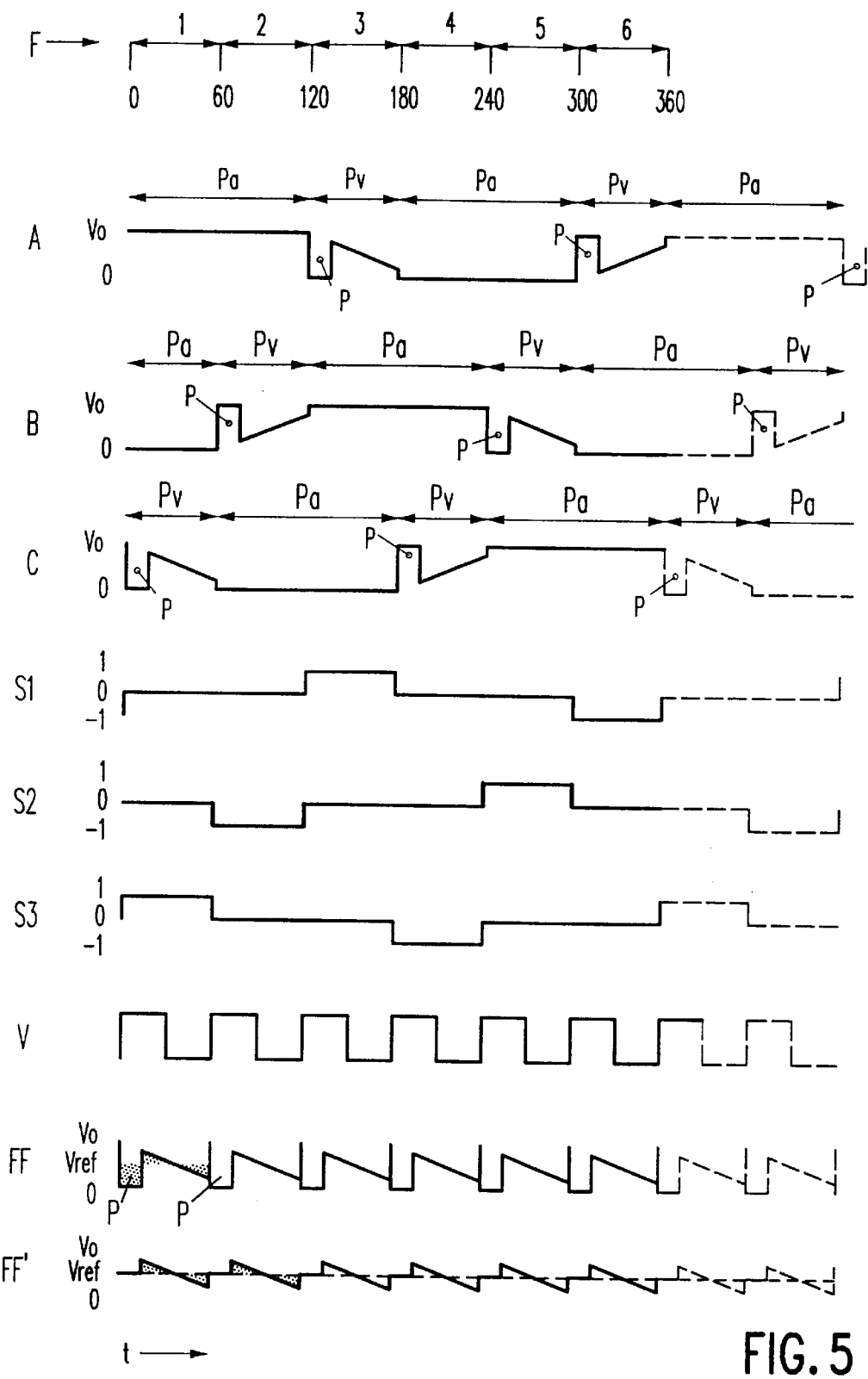
FIG. 5 shows waveform diagrams to illustrate the operation of the drive circuit shown in FIG. 1.

A first row marked F in FIG. 5 gives the six different phases which occur successively when the motor performs one complete electrical revolution. Rows A, B and C respectively give the voltage as a function of time for the nodes A, B and C of the motor. This shows, for example, that during the first and the second phase the voltage on the node A is equal to the supply voltage $V_o$. During the third phase the node A is floating and a back-emf signal is generated in the winding 2. At the beginning of the fourth phase the voltage on the node A becomes equal to the voltage on the zero point because the node A is connected to the zero-potential line 28. This situation is maintained during the fourth and the fifth phase. In the sixth phase the node A becomes floating again and another back-emf signal is generated. In the node B the same signal is generated as in the node A, the signal in the node B being 120° shifted in phase relative to the signal in the node A. Likewise, a signal generated in the node C has a 240° phase shift relative to the signal in the node A.

As already stated, the back-emf signal contains information about the position of the rotor of the motor. In order to enable all the information to be used the back-emf signal appearing in the nodes A, B and C is sampled, inverted when necessary, and combined to form a phase-error signal (FF) as shown in FIG. 5. For correctly combining the back-emf signals to form the phase-error signal the drive circuit further comprises the decoder 48, to which the output signals of the sequencer 20 are applied. In a manner known per se the output signals of the sequencer 20 are so processed that the decoder 48 generates the switching signals $S_1, S_2, S_3$ on the lines 50, 52, 54, respectively. The switching signals $S_1$, $S_2$ and $S_3$ are applied to the phase detector 40 via the lines 50, 52 and 54. When the signal $S_1$ assumes the value 1 the signal on the line 12 (the signal on the node A) is transmitted unaltered. If the signal $S_1$ assumes the value 0, the signal on the line 12 is blocked and if the signal $S_1$ assumes the value −1, the signal on the line 12 is inverted. This also applies to the signals on the lines 14 and 16 in relation to the signals $S_2$ and $S_3$. As a result, the phase-error signal as shown in FIG. 5 is generated on the output of the phase detector 40 on the line 66. Thus, the phase detector 40 has combined all the available back-emf signals and has given them the same polarity. The advantage is that all the available back-emf information is present in the phase-error signal (FF). If subsequently the phase-error signal is applied directly to the low-pass filter 42, any spurious components which, for example, may have been caused by the pulse-width modulator 56 and which, by way of example, have been shown in the second phase of the phase-error signal, are inhibited by the filter. Thus, the low-pass filter generates a control signal in which jitter that may have been caused by the pulse-width modulator has been inhibited. By means of a line 68 the control signal is applied to the controllable oscillator 44, which in response thereto generates the frequency signal (V), as shown in FIG. 5, on the line 38. The sequencer 20 is clocked by the frequency signal (V).

However, the phase-error signal (FF) includes flyback pulses (P) which do not contain information about the actual rotor position and which partly mask the back-emf signal. The flyback pulses start immediately after the controllable oscillator 44 has initiated a commutation. In other words, the flyback pulses for a given winding start immediately after the supply of a drive signal to the relevant winding has ceased and the winding is kept floating. The duration of the flyback pulse depends on the motor current and the self-induction effect. This makes it difficult to start a motor because the useful back-emf signal is then comparatively small whereas the flyback pulses are comparatively wide. As a result of this, the low-pass filter 42 generates an output signal which depends not only on the back-emf signal but also on the flyback pulses. Since the flyback pulses are independent of the instantaneous rotor position, the output signal of the low-pass filter will exhibit an error whose magnitude depends on the magnitude of the flyback pulse. The rotor position will then not be controlled correctly by the phase-locked loop.

In order to mitigate the problem of the flyback pulses the drive circuit shown in FIG. 1 further comprises a masking circuit 70. The masking circuit 70 suppresses flyback pulses in the phase-error signal (FF) in order to obtain a corrected signal (FF'). In the present example the flyback pulses are even removed from the phase-error signal. In particular, the supply of the phase-error signal to the low-pass filter is inhibited at the instant at which the flyback pulse appears. Each inhibition is initiated at the beginning of a free period. This means that initiation occurs at the instant that a commutation occurs, i.e. a transition from a free period ($P_v$) of a winding to a drive period ($P_a$). Moreover, each inhibition in a respective free period is terminated when the masking circuit detects that the relevant flyback pulse has ceased. For this purpose, the masking circuit may comprise, for example, a detection circuit which detects the end of the flyback pulse. This is possible in various ways and the examples given below are non-exhaustive. Such a detection circuit may comprise, for example, an edge detector. Alternatively, the detection circuit may comprise a comparator, which detects whether the back-emf signal or a derivative of the back-emf signal is equal to a predetermined reference value within at least a part of the relevant period.

This means in any case that the duration of said inhibition is not longer than strictly necessary. At the instant at which the flyback pulse is no longer present the masking circuit 70 will again transfer the phase-error signal directly to the filter 42 via the line 72.

Figure 6:
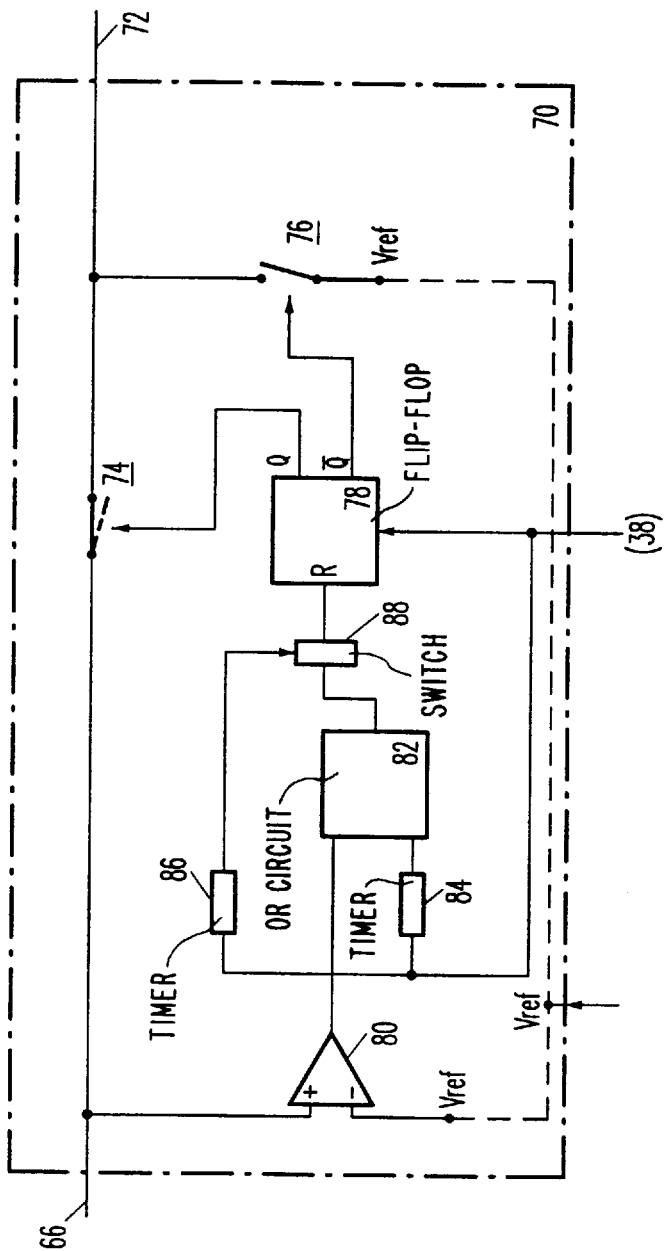
FIG. 6 shows an example of a masking circuit of the drive circuit shown in FIG. 1.

FIG. 6 shows an example of the masking circuit 70. The masking circuit 70 comprises first controllable switching means 74 with at least one open and one closed state. In the closed state the phase-error signal on the line 66 is transferred directly, via the line 72, to the low-pass filter 42. The masking circuit further comprises second switching means 76 with at least one open and one closed state. When the second switching means are in the closed state the line 72 is connected to a reference voltage (Vref). the line 72 then carries a first reference signal determined by the reference voltage, which signal is applied to the low-pass filter 42. The first and the second switching means 74, 76 are controlled, respectively, by the Q output and the $\overline{Q}$ output of a flip-flop 78. The flip-flop 78 is clocked by the output signal of the oscillator on the line 38. The masking circuit further comprises a detection circuit in the form of a comparator 80 having a first input connected to the line 66 and having a second input to which a direct voltage is applied. Thus, a second reference signal is applied to the second input, which in the present example is identical to the first reference signal. The output of the comparator 80 is connected to the input of an OR-operator circuit 82. The frequency signal on the line 38 is also applied to a first timer 84 and a second timer 86. The output of the first timer 84 is connected to a second input of the OR-operator circuit 82. The output of the second timer 86 is connected to third switching means 88 in order to control these switching means. The output of the OR-operator circuit 82 is connected to the input of the flip-flop 78 via the third switching means.

The masking circuit 70 operates as follows. As soon as the oscillator 44 initiates a commutation the flip-flop is reset via the line 38. This means that the flip-flop controls the first switching means 74 so as to open them and the second switching means 76 so as to close them. The flip-flop thus forms inter alia a starting circuit for starting the inhibition of the back-emf signal. As a result, the first reference signal, which in this case is formed by the reference voltage Vref, is applied to the input of the low-pass filter 42. In the present example, the reference voltage Vref is equal to half the supply voltage $V_o$. As long as a flyback pulse appears on the line 66, the voltage on this line will be approximately 0. However, as soon as the flyback pulse ceases, the voltage on the line 66 will increase. At the instant at which the voltage on the line 66 is equal to Vref the comparator 80 will generate an output signal equal to 0. When it is assumed that the third switching means 88 are closed, this results in the flip-flop being set to the other state, causing the first switching means 74 to be closed and the second switching means 76 to be opened. As a result of this, the phase-error signal on the line 66 is no longer interrupted and is applied to the input of the low-pass filter 42 via the line 72.

The initiation of a commutation by the oscillator 44 also starts the first timer 84. A feature of the first timer 84 is that this timer supplies a signal which is not zero at an instant that this timer is started. The timer 84 maintains this signal until a predetermined minimum period has expired. When it is assumed again that the third switching means are closed, this means that the flip-flop remains in its original state for at least said minimum period, so that the first switching means 74 remain open during this minimum period and the second switching means remain closed during this minimum period. As a result of internal delays in the drive circuit 1 the actual commutation, i.e. the response of the inverter to the frequency signal from the oscillator will appear slightly later. This gives rise to disturbances in the sampled back-emf signal. Since all these disturbances occur within said minimum period, they will not be applied to the low-pass filter. At the end of the predetermined minimum period the output signal of the first timer will go to zero. From this instant, the state of the flip-flop will consequently be dependent on the output signal of the comparator 80.

The second timer 86 is also reset at an instant at which the oscillator initiates a commutation. From this instant, the output signal of the second timer will assume a non-zero value. The third switching means 88 are closed as long as the output signal of the second timer is not zero. However, the third switching means will be opened in that the output signal of the second timer becomes zero after a predetermined maximum period. This maximum period is longer than said minimum period and shorter than the length of the free period in which the emf signal can occur. If the flyback pulse does not appear or is not detected by the comparator for any reason whatsoever, the second timer will ensure that the third switching means are opened after expiry of the maximum period. As a result, the first switching means 74 will be closed again and the second switching means 76 will be opened via the flip-flop 78. Since the duration of a period in which a back-emf signal can occur depends on the motor speed, it is preferred to make said maximum period of the second timer 86 dependent on the instantaneous speed of the motor. The maximum period can be smaller as the motor speed is higher. This can be achieved, for example, by setting the timer 86 by means of the frequency signal generated on the line 38 by the oscillator 44.

In the present example the low-pass filter comprises an integrator, which integrates the difference between the phase-error signal and a third reference signal in order to obtain the control signal applied to the oscillator 44. In this example, the third reference signal again consists of the reference voltage Vref. This has the advantage that no difference voltage appears at the input of the integrator when the masking circuit feeds the first reference signal to the low-pass filter. However, it will be evident that it is also possible to use other types of low-pass filters, such as for example passive RC filters.

It is emphasized that the scope of the invention is by no means limited to the example described above.

For example, the first switching means may be replaced by an attenuator, which attenuates the flyback pulses rather than suppress them completely. Besides, as already stated, the presence of a flyback pulse can also be detected in other manners. In the present example, the start of a flyback pulse is determined on the basis of the frequency signal generated by the oscillator. Obviously, it is also possible to determine both the beginning and the end of the flyback pulse on the basis of the phase-error signal itself by means of a suitable detection circuit.

Moreover, the first and the second reference signal need not necessarily be equal to one another. As already stated, the detection circuit may include an edge detector. For this purpose, the comparator may, for example, be combined with a differentiator, which determines the slope of the phase-error signal. As soon as the slope exceeds a predetermined value, the conclusion may be drawn that the trailing edge of a flyback pulse has been detected. For this purpose, the differentiated signal may, for example, be applied to the comparator, which compares the differentiated signal with a reference value.

In the present example, the suppression of the back-emf signal is discontinued upon detection of the end of the flyback pulse. This means that the suppression period is variable. However, it is alternatively possible to provide the masking circuit with a stop timer to terminate suppression upon expiry of a suppression period of a predetermined duration. It is equally possible to provide the masking circuit with a controllable stop timer to terminate suppression upon expiry of a suppression period whose length depends on the instantaneous speed of rotation of the motor. Likewise, suppression may be terminated upon expiry of a given time after detection of the trailing edge of the flyback pulse.

The starting circuit described above initiates each suppression at the instant that the multi-phase inverter is set to a new phase in response to the application of the frequency signal. However, it is also possible for the starting circuit to detect the beginning of a free period on the basis of another signal, such as for example the back-emf signal itself.

Figure 7:
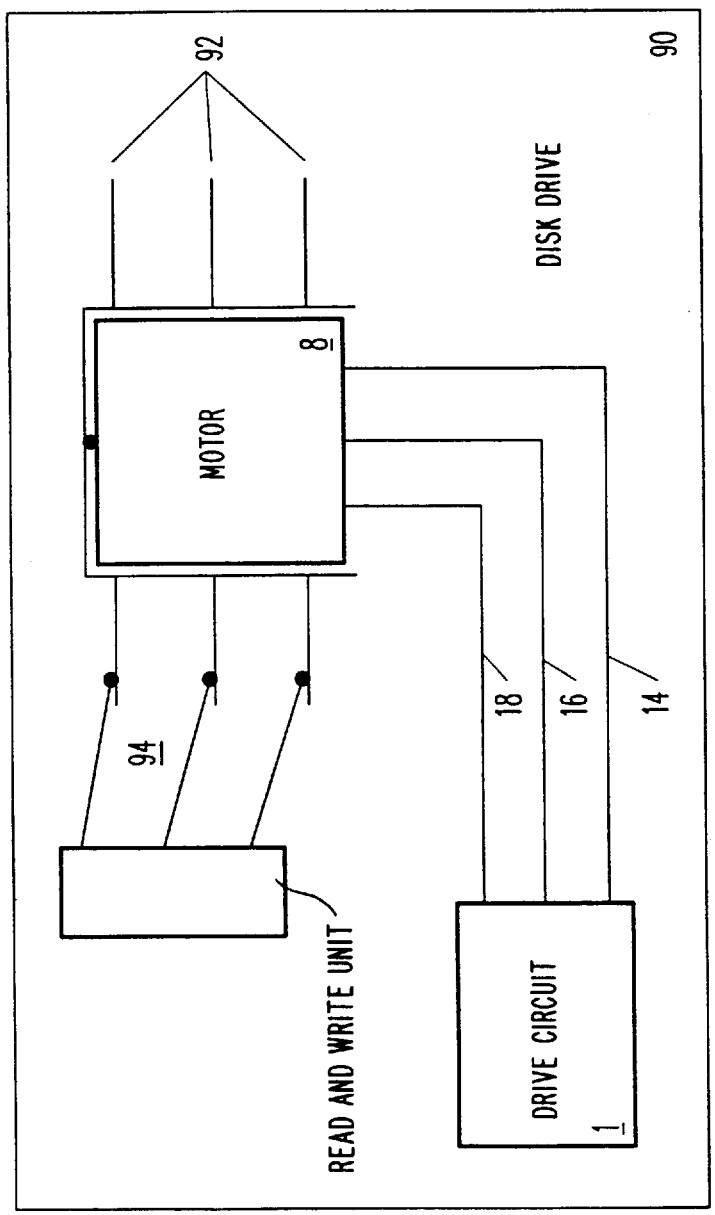
FIG. 7 shows an example of a disk-drive including a drive circuit as shown in Figure.

Moreover, the invention is by no means limited to a three-phase d.c. motor. On the basis of the same principles the invention can also be used for 2-phase, 3-phase, 4-phase, 5-phase, . . . , n-phase motors. Besides, the invention is not limited to its use in conjunction with three-phase motors having windings arranged in a Y-configuration. Other configurations are also conceivable. A drive system comprising a multi-phase d.c. motor and an arrangement (drive circuit) in accordance with the invention is preferably used in disk drives, such as computer hard-disk drives, CD-ROM drives, floppy-disk drives and the like. FIG. 7 shows an example of such a disk drive 90. The disk drive 90 comprises an information carrier in the form of an assembly of, in the present example three, magnetizable disks 92. The disk drive further comprises a read and write unit 94 for writing digital information on the rotatable disks 92 and for reading digital information from the disks 92. The rotatable disks 92 are driven by the drive circuit 1 and the motor 8 as shown in FIG. 1. The advantage of the disk drive 90 is that the start-up of the disk drive 90 is very reliable. This means that there is no risk that the disk drive 90 begins to rotate in an undesired direction upon starting while nevertheless the disk drive will start up very rapidly. This is achieved as a result of a combination of the phase-locked loop and the masking circuit 70. The phase-locked loop guarantees that the motor 8 is started with the desired direction of rotation. Without any further steps the use of the phase-locked loop would result in a comparatively long start-up time for the disk drive. The masking circuit 70 ensures that starting is effected rapidly. However, the drive circuit is also suitable for use in conjunction with other drives. All these variants are considered to fall within the scope of the invention.

I claim:

1. A drive circuit for supplying drive signals to a plurality of windings of a multi-phase d.c. motor, comprising:

a multi-phase inverter for supplying the drive signals to the windings of the motor, said windings being recurrently energized by the drive signals in a given sequence, at least one winding not being supplied with a drive signal at least during predetermined free periods;

a phase detector under control of said multi-phase inverter, for sampling the back-emf signal of said at least one winding during a plurality of said free periods in which no drive signal is applied to said at least one winding, to obtain a phase-error signal;

a low-pass filter for generating a control signal in dependence upon the phase-error signal;

a controllable oscillator for generating a frequency signal whose phase and frequency depend on the control signal, the timing with which the multi-phase inverter supplies the drive signals to the windings being dependent on the frequency and phase of the frequency signal; and a masking circuit for inhibiting the further processing of the phase-error signal by the low-pass filter temporarily, at least during the presence of a flyback pulse in the phase-error signal, whereby the processing of the flyback pulses present in the phase-error signal is inhibited.

2. A drive circuit as claimed in claim 1, wherein the masking circuit comprises first switching means for interrupting the supply of the phase-error signal to the low-pass filter to inhibit the further processing of flyback pulses.

3. A drive circuit as claimed in claim 2, wherein the masking circuit supplies a first reference signal to the low-pass filter when the supply of the phase-error signal to the low-pass filter is interrupted.

4. A drive circuit as claimed in claim 3, wherein the masking circuit further includes a detection circuit for detecting the end of a flyback pulse and a second controllable switching means having at least one open state and one closed state, the first reference signal being supplied to the low-pass filter in a closed state of the second switching means, the supply of the first reference signal to the low-pass filter being inhibited in an open state of the second switching means, and the second switching means being controlled in dependence upon an output signal of the detection circuit.

5. A drive circuit as claimed in claim 4, wherein the masking circuit comprises a first timer which is reset by the oscillator at the beginning of the free period and which subsequently supplies a signal until expiry of a predetermined minimum inhibition period, whereby the first switching means remain in an open state, and the second switching means remain in the closed state as a result of the presence of the signal supplied by the first timer.

6. A drive circuit as claimed in claim 2, wherein the first switching means are controllable and can assume at least one open state and one closed state, the phase-error signal being supplied to the low-pass filter in the closed state and the supply of the phase-error signal to the low-pass filter being inhibited in the open state, and the masking circuit further includes a detection circuit for the detection of the end of a flyback pulse, the first switching means being controlled in dependence on an output signal of the detection circuit.

7. A drive circuit as claimed in claim 6, wherein the masking circuit supplies a first reference signal to the low-pass filter when the supply of the phase-error signal to the low-pass filter is interrupted, and the detection circuit comprises a comparator to which are applied the phase-error signal and a second reference signal representative of a reference value determined by the back-emf signal during a said free period.

8. A drive circuit as claimed in claim 7, wherein the first and the second reference signal are identical to one another.

9. A drive circuit as claimed in claim 6 wherein the masking circuit includes a stop circuit which, in a free period, terminates each inhibition when the back-emf signal or a derivative of the back-emf signal is equal to a predetermined reference value.

10. A drive circuit as claimed in claim 3, wherein the masking circuit further includes a detection circuit for the detection of the end of a flyback pulse, the first switching means being controlled in dependence on an output signal of the detection circuit, the detection circuit comprises a comparator to which are applied the phase-error signal and a second reference signal representative of a reference value, and the low-pass filter comprises an integrator which integrates the difference between the phase-error signal and a third reference signal in order to obtain the control signal.

11. A drive circuit as claimed in claim 10, wherein the first and the third reference signal are identical to one another.

12. A drive circuit as claimed in claim 11, wherein said reference signals are each constituted by a d.c. signal.

13. A drive circuit as claimed in claim 2 wherein the masking circuit includes second switching means to supply a first reference voltage to the low-pass filter when the first switching means interrupts the supply of the phase-error signal to the low-pass filter.

14. A drive circuit as claimed in claim 1, wherein the masking circuit comprises a starting circuit for initiating an inhibition at the beginning of said free period in which no drive signal is applied to the relevant winding.

15. A drive circuit as claimed in claim 14, wherein the starting circuit initiates each inhibition at an instant at which the multi-phase inverter is set to a new phase in response to the application of the frequency signal.

16. A drive circuit as claimed in claim 14, wherein the masking circuit includes a stop circuit which terminates each inhibition in a relevant free period when the back-emf signal or a derivative of the back-emf signal is equal to a predetermined reference value within at least a part of said relevant free period.

17. A drive circuit as claimed in claim 16, wherein the masking circuit terminates the inhibition after expiry of a maximum inhibition period of a predetermined duration.

18. A drive circuit as claimed in claim 17, wherein the masking circuit inhibits the processing of the phase-error signal by the low-pass filter at least for a minimum inhibition period of a predetermined duration.

19. A drive circuit as claimed in claim 18, wherein the minimum period is smaller than the maximum period.

20. A drive circuit as claimed in claim 19, wherein the masking circuit further includes first switching means for interrupting the supply of the phase-error signal to the low-pass filter to inhibit the further processing of flyback pulses, and a second timer which is started by the oscillator at the beginning of the free period and which subsequently supplies a signal after expiry of the predetermined maximum period, whereby the first switching means are set to the open state from the closed state.

21. A drive circuit as claimed in claim 20, wherein the second switching means, when still in the open state, are set to the closed state as a result of the presence of the signal supplied by the second timer.

22. A drive circuit as claimed in claim 17, wherein the masking circuit further comprises first switching means for interrupting the supply of the phase-error signal to the low-pass filter to inhibit the further processing of flyback pluses and a first timer which is reset by the oscillator at the beginning of the free period and which subsequently supplies a signal until expiry of a predetermined minimum inhibition period, whereby the first switching means remain in an open state.

23. A drive circuit as claimed in claim 22, wherein the masking circuit further comprises a detection circuit for detecting the end of a flyback pulse, second controllable switching means controlled by an output signal of the detection circuit, an OR-operator circuit, third controllable switching means and a flip-flop, the output of the detection circuit and the output of the first timer being connected to respective inputs of the OR-operator circuit, the output of the OR-operator circuit being connected to the input of the flip-flop via the third controllable switching means, the third controllable switching means being controlled by the second timer, and the first and the second controllable switching means being respectively controlled by the two outputs (Q, $\overline{Q}$) of the flip-flop.

24. A drive circuit as claimed in claim 14, wherein the masking circuit includes a stop timer for terminating an inhibition after expiry of an inhibition period of a predetermined duration.

25. A drive circuit as claimed in claim 14, wherein the masking circuit includes a controllable stop timer for terminating an inhibition after expiry of an inhibition period whose length depends on the instantaneous speed of rotation of the motor.

26. A drive circuit as claimed in claim 1, which further includes a motor speed controller comprising a pulse-width modulator for modulating the drive signals supplied to the windings of the motor.

27. A drive system comprising a multi-phase d.c. motor and a drive circuit as claimed in claim 1.

28. A disc drive including a drive system as claimed in claim 27.

29. A drive circuit as claimed in claim 1 wherein the masking circuit includes means for inhibiting the processing of the phase-error signal by the low-pass filter at least for a minimum inhibition period of a predetermined duration.

* * * * *

Disclaimer 5,859,512—Henricus C. J. Büthker, Eindhover, Netherlands. DRIVE CIRCUIT SUPPLYING DRIVE SIGNALS TO A PLURALITY OF WINDINGS OF A MULTI-PHASE D.C. MOTOR. Patent dated January 12, 1999. Disclaimer filed June 24, 2008, by the assignee, U.S. Philips Corporation.

Hereby disclaims all of the claims of said patent.

*(Official Gazette September 30, 2008)*